United States Patent [19]

Tsukagoshi

[11] Patent Number: 5,732,802
[45] Date of Patent: Mar. 31, 1998

[54] METHOD OF DAMPING VIBRATION OF STRUCTURE

[76] Inventor: Isamu Tsukagoshi, C-1509, 2-1, Sunadabashi, Higashi-ku, Nagoya-shi, Aichi-ken, Japan

[21] Appl. No.: 721,538

[22] Filed: Sep. 26, 1996

[51] Int. Cl.⁶ .................................................. F16F 15/02
[52] U.S. Cl. .......................... 188/378; 267/136; 52/167.1
[58] Field of Search ................................ 188/378, 379, 188/380, 268; 267/136; 52/1, 167.1, 167.3, 167.4, 167.6, 167.2, 167.5; 248/562, 638, 636

[56] References Cited

U.S. PATENT DOCUMENTS

| | | | |
|---|---|---|---|
| 3,691,712 | 9/1972 | Bowling et al. | 188/268 |
| 3,796,017 | 3/1974 | Meckler | 52/167.3 |
| 4,039,050 | 8/1977 | Bowling et al. | 188/268 |
| 4,480,731 | 11/1984 | Izeki et al. | 52/167.3 |
| 4,890,430 | 1/1990 | Kobori et al. | 52/167.3 |
| 4,910,929 | 3/1990 | Scholl | 52/167.3 |
| 4,922,667 | 5/1990 | Kobori et al. | 52/167.2 |
| 4,922,671 | 5/1990 | Sato | 52/167.2 |
| 5,005,326 | 4/1991 | Ishimaru et al. | 52/167.2 |
| 5,065,552 | 11/1991 | Kobori et al. | 52/167.3 |
| 5,107,634 | 4/1992 | Onoda et al. | 52/167.2 |
| 5,168,967 | 12/1992 | Abiru et al. | 188/378 |
| 5,271,197 | 12/1993 | Uno et al. | 52/167.1 |
| 5,339,580 | 8/1994 | Koshika et al. | 52/167.1 |

FOREIGN PATENT DOCUMENTS 7247727   9/1995   Japan .

*Primary Examiner*—Douglas C. Butler
*Attorney, Agent, or Firm*—Sixbey, Friedman, Leedom & Ferguson, P.C.; Gerald J. Ferguson, Jr.; Tim L. Brackett, Jr.

[57] ABSTRACT

Vibration of a structure is damped using vibration damping mechanisms. Each vibration damping mechanism has a first plate rotatably mounted on a pair of first pivot shafts respectively mounted on a pair of opposed frame members of the structure, a second plate which is rotatably mounted on a pair of second pivot shafts respectively mounted on the opposed frame members at a predetermined distance from the first pivot shafts and is opposed to the first plate intervening a space therebetween, and a viscoelastic body provided in the space between the first and second plates. A plurality of vibration damping mechanisms having viscoelastic bodies different from each other in mechanical properties are mounted between the opposed frame members and a conversion coefficient β which is the ratio of the distance L between the first and second pivot shafts to the distance h between the first pivot shafts or between the second pivot shafts for each vibration damping mechanism is set according to the mechanical properties of the viscoelastic body of the vibration damping mechanism.

6 Claims, 14 Drawing Sheets

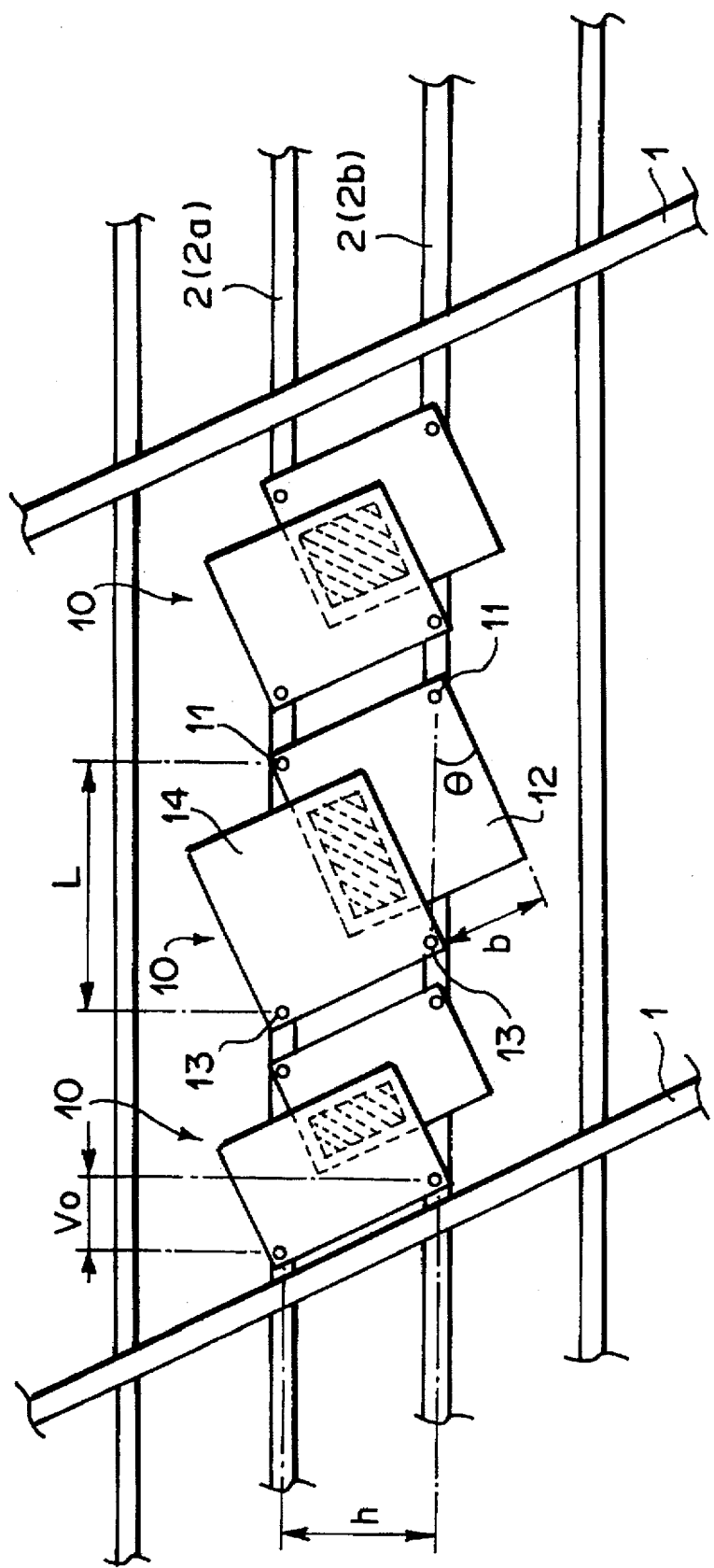

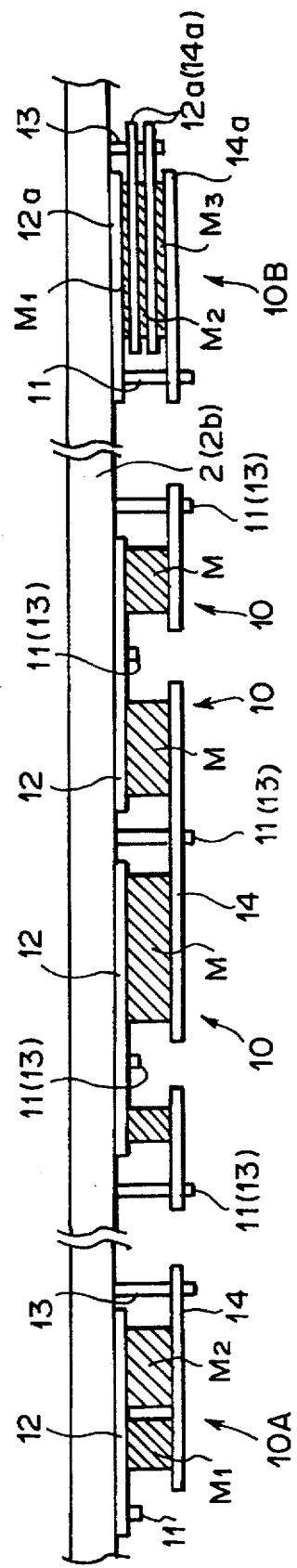

METHOD OF DAMPING VIBRATION OF STRUCTURE

BACKGROUND OF THE INVENTION

1. Field of the Invention

This invention relates to a method of damping vibration of a structure such as a building.

1. Description of the Related Art

A conventional method of damping vibration of a structure using a viscoelastic body will be described with reference to FIGS. 18 to 20, hereinbelow. FIG. 18 is a front view of a plurality of vibration damping mechanisms mounted on a skeleton framing, FIG. 19 is a view taken in the direction of arrows C—C in FIG. 18 and FIG. 20 is a view showing operation of the vibration damping mechanism.

In FIG. 18, a plurality transverse members 2 extend across a pair of posts 1 and are arranged in the vertical direction. A plurality of vibration damping mechanisms 50 are installed between adjacent transverse members 2, the upper one being indicated at 2a and the lower one being indicated at 2b. The vibration damping mechanism 50 comprises a flat rear plate 51 fixed to the upper transverse member 2a, a flat front plate 52 which is fixed to the lower transverse member 2b by bolts 53 to be opposed to the rear plate 51 spaced therefrom, and a viscoelastic body M sandwiched between the rear and front plates 51 and 52. The viscoelastic body M generally has properties that the resistance to vibration at a given amplitude is small in a soft material and large in a hard material while the resistance to vibration at a limit amplitude (the limit to which the viscoelastic body M can properly function) is large in a soft material and small in a hard material. Accordingly the kind of the viscoelastic body M is generally selected to conform to the maximum allowable amplitude. When vibration at an amplitude of V0 acts on the structure in a horizontal direction, the rear and front plates 51 and 52 are oscillated relative to each other in the horizontal direction by a distance equal to the amplitude V0 as shown in FIG. 20 and vibration energy is consumed through resistance to shearing deformation of the viscoelastic body M caused by the oscillation of the plates 51 and 52 relative to each other, thereby damping the vibration.

As shown in FIG. 20, in the vibration damping mechanism 50, the amount of oscillation of the rear and front plates 51 and 52 relative to each other is equal to the amplitude V0 and the resistance of the viscoelastic body M solely depends upon the amount of oscillation of the rear and front plates 51 and 52. Accordingly in the conventional system, sufficient resistance cannot be obtained at amplitudes other than the maximum allowable amplitude, and even if the kinds of the viscoelastic body M differ by the vibration damping mechanism 50, amplitudes of vibration which can be satisfactorily damped are limited.

SUMMARY OF THE INVENTION

In view of the foregoing observations and description, the primary object of the present invention is to provide a method of damping vibration which can effectively damp vibration acting on a structure irrespective of the amplitude of the vibration.

In accordance with a first aspect of the present invention, there is provided a method of damping vibration of a structure using one or more vibration damping mechanisms each comprising a first plate rotatably mounted on a pair of first pivot shafts respectively mounted on a pair of opposed frame members of the structure, a second plate which is rotatably mounted on a pair of second pivot shafts respectively mounted on the opposed frame members at a predetermined distance from the first pivot shafts and is opposed to the first plate intervening a space therebetween, and a viscoelastic body provided in the space between the first and second plates, which method characterized in that a vibration damping mechanism having a plurality of viscoelastic bodies which are different from each other in mechanical properties is mounted between said pair of opposed frame members or a plurality of vibration damping mechanisms having viscoelastic bodies different from each other in mechanical properties are mounted between said pair of opposed frame members and a conversion coefficient β which is the ratio of the distance L between the first and second pivot shafts to the distance h between the first pivot shafts or between the second pivot shafts for each vibration damping mechanism is set according to the mechanical properties of the viscoelastic body of the vibration damping mechanism.

When vibration acts on the structure in a direction, the first and second plates are oscillated relative to each other in a direction perpendicular to the direction of the vibration. The amount of oscillation is the product of the amplitude of the vibration and an amplitude conversion coefficient β which is the ratio of the distance L between the first and second pivot shafts to the distance h between the first pivot shafts or between the second pivot shafts Accordingly, the amount of oscillation can be set to any value irrespective of the amplitude of the vibration imparted thereto by suitably setting the conversion coefficient β. As a result, by using a plurality of vibration damping mechanisms having different kinds of viscoelastic body M and properly setting the conversion coefficient β for each vibration damping mechanism according to the mechanical properties of the viscoelastic bodies, large resisting force can be obtained against various amplitudes.

In accordance with a second aspect of the present invention, there is provided a method of damping vibration of a structure using one or more vibration damping mechanisms each comprising a first pillar rotatably mounted on a pair of first pivot shafts respectively mounted on a pair of opposed frame members of the structure, a second pillar rotatably mounted on a pair of second pivot shafts respectively mounted on the opposed frame members at a predetermined distance from the first pivot shafts, and a vibration energy consuming means which is connected between the first and second pillars and oriented in a direction other than the direction of the vibration, which method characterized in that a vibration damping mechanism having a plurality of vibration energy consuming means which are different from each other in mechanical properties is mounted between said pair of opposed frame members or a plurality of vibration damping mechanisms having vibration energy consuming means different from each other in mechanical properties are mounted between said pair of opposed frame members and a conversion coefficient 6 which is the ratio of the distance L between the first and second pivot shafts to the distance h between the first pivot shafts or between the second pivot shafts for each vibration damping mechanism is set according to the mechanical properties of the vibration energy consuming means of the vibration damping mechanism.

When vibration acts on the structure in a direction, the vibration energy consuming means are oscillated in a direction perpendicular to the direction of the vibration. The amount of oscillation is the product of the amplitude of the vibration and an amplitude conversion coefficient β which is the ratio of the distance L between the first and second pivot shafts to the distance h between the first pivot shafts or between the second pivot shafts. Accordingly, the amount of oscillation can be set to any value irrespective of the amplitude of the vibration imparted thereto by suitably setting the conversion coefficient β. As a result, by using a plurality of vibration damping mechanisms having different kinds of vibration energy consuming means and properly setting the conversion coefficient β for each vibration damping mechanism according to the mechanical properties of the vibration energy consuming means, large energy consumption can be obtained against various amplitudes.

In accordance with a third aspect of the present invention, there is provided a method of damping vibration of a structure using one or more vibration damping mechanisms each comprising first and second pillars which are fixed to a frame member at their one ends at a predetermined distance from each other and a vibration energy consuming means which is connected between the first and second pillars or between the first pillar and a support, which supports the structure, and oriented in a direction other than the direction of the vibration, which method characterized in that a vibration damping mechanism having a plurality of vibration energy consuming means which are different from each other in mechanical properties is mounted between said first and second pillars or between the first pillar and the support, or a plurality of vibration damping mechanisms having vibration energy consuming means different from each other in mechanical properties are mounted between said first and second pillars or between the first pillar and the support, and a conversion coefficient β which is the ratio of the distance L between the first and second pillars or between the first pillar and the support to the distance h between the frame member and the vibration energy consuming means for each vibration damping mechanism is set according to the mechanical properties of the vibration energy consuming means of the vibration damping mechanism.

When vibration acts on the structure in a direction, the vibration energy consuming means are oscillated in a direction perpendicular to the direction of the vibration. The amount of oscillation can be set to any value irrespective of the amplitude of the vibration imparted thereto by suitably setting the distance L between the first and second pillars or between the first pillar and the support of the structure to the distance h between the structure and the vibration energy consuming means. As a result, by using a plurality of vibration damping mechanisms having different kinds of vibration energy consuming means and properly setting L and h for each vibration damping mechanism according to the mechanical properties of the vibration energy consuming means, large energy consumption can be obtained against various amplitudes.

Thus by installing vibration damping mechanisms according to the method of the present invention, vibration of a structure can be effectively damped and accordingly a highly durable structure can be built. Further since the vibration damping mechanisms are simple in structure, such a durable structure can be built at low cost.

BRIEF DESCRIPTION OF THE DRAWINGS

FIG. 5 is a view showing operation of the vibration damping system, FIG. 8 is a cross-sectional view showing modifications of the vibration damping mechanism.

DESCRIPTION OF THE PREFERRED EMBODIMENTS

Figure 1:
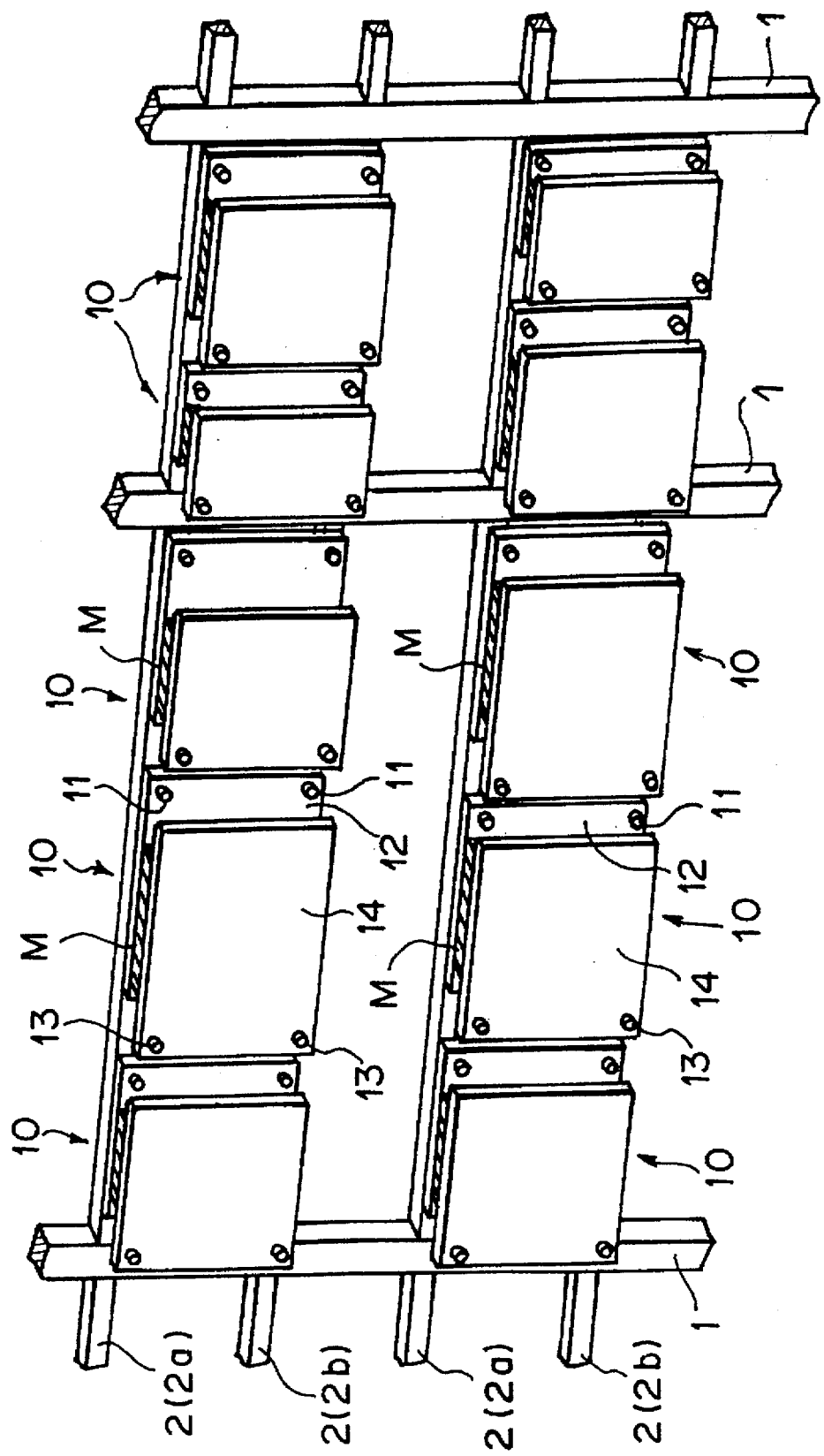
FIG. 1 is a perspective view of a vibration damping system for carrying out a vibration damping method in accordance with a first embodiment of the present invention.
Figure 2:
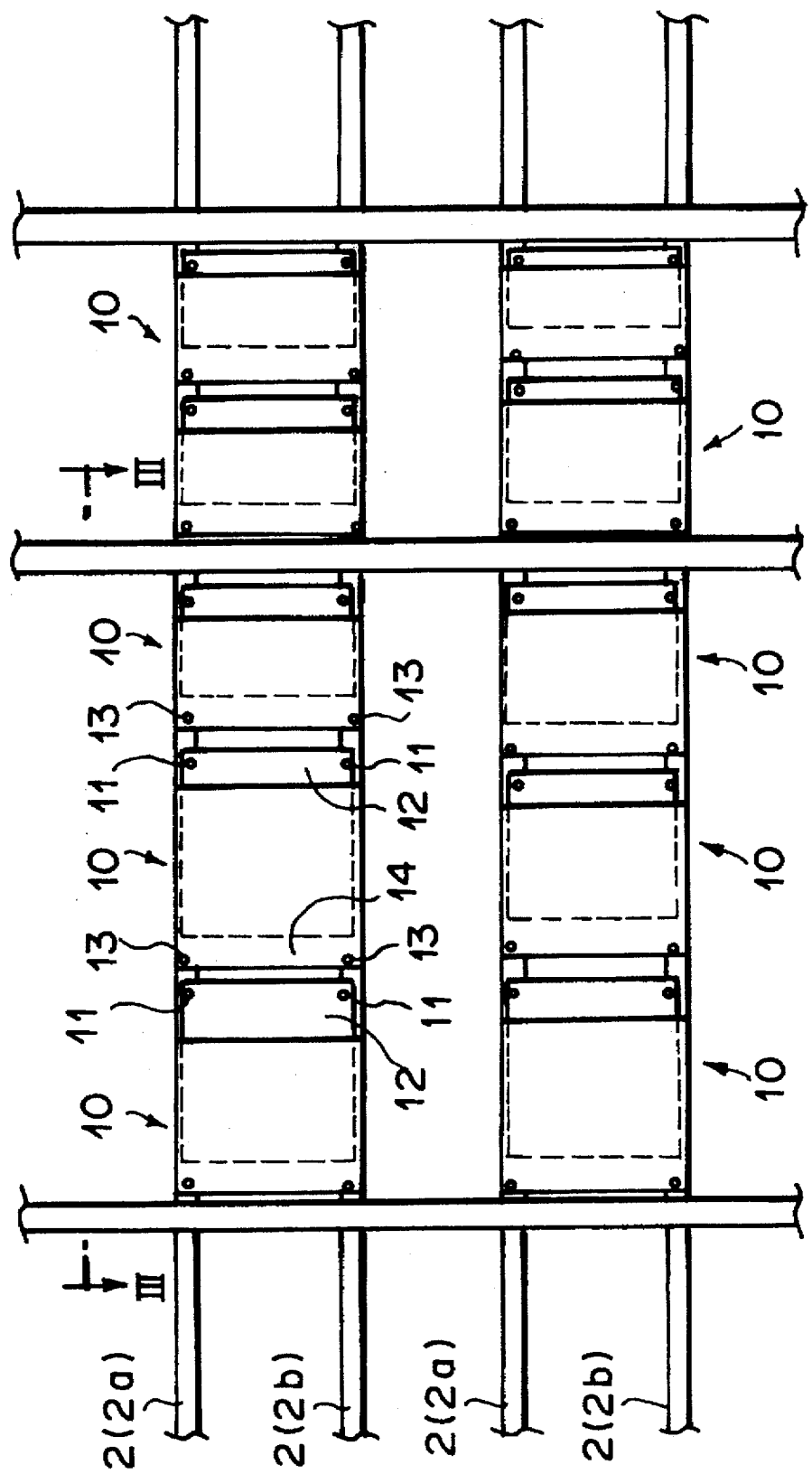
FIG. 2 is a front view of the vibration damping system.
Figure 3:
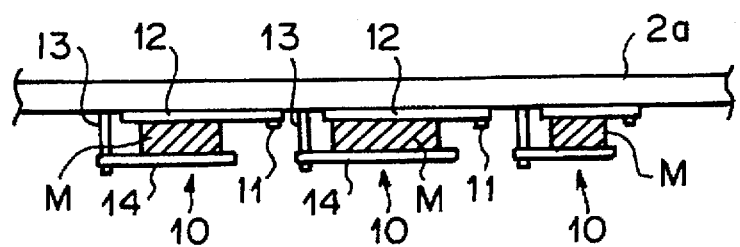
FIG. 3 is a view taken in the direction of arrows III—III in FIG. 2.

In FIGS. 1 to 3, a vibration damping system for carrying out a vibration damping method in accordance with a first embodiment of the present invention comprises a plurality of vertical posts (frame members) 1 stood at predetermined intervals and a plurality of transverse members (frame members) 2 which extend across the posts 1 and are arranged in the vertical direction. A plurality of vibration damping mechanisms 10 are installed between a pair of opposed transverse members 2, i.e., upper transverse member 2a and lower transverse member 2b. Each vibration damping mechanism 10 comprises a pair of first pivot shafts 11, a pair of second pivot shafts 13, a first plate 12, a second plate 14 and a viscoelastic body M. One of the first pivot shafts 11 is mounted on the upper transverse member 2a and the other is mounted on the lower transverse member 2b.

Figure 4:
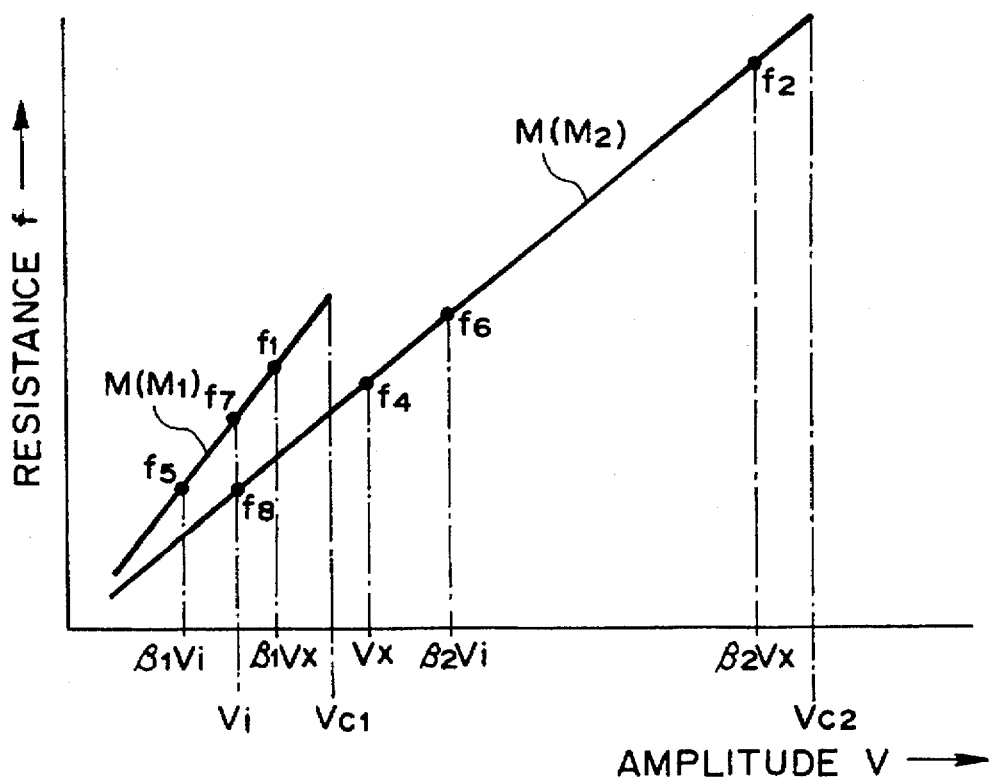
FIG. 4 is a view showing properties of the viscoelastic body.

The first pivot shafts 11 are positioned in alignment with each other in a vertical direction. One of the second pivot shafts 13 is mounted on the upper transverse member 2a at a predetermined distance from he first pivot shaft 11 on the upper transverse member 2a and the other is mounted on the lower transverse member 2b at the same distance from the first pivot shaft 11 on the lower transverse member 2b. The second pivot shafts 13 are positioned in alignment with each other in a vertical direction. The first plate 12 is a flat plate which extends between the upper and lower transverse members 2a and 2b and is supported for rotation by the first pivot shafts 11 which are loosely fitted in holes (not shown) respectively formed at an upper corner and a lower corner of the first plate 12. The second plate 14 is a flat plate which extends between the upper and lower transverse members 2a and 2b and is supported for rotation by the second pivot shafts 13 which are loosely fitted in holes (not shown) respectively formed at an upper corner and a lower corner of the second plate 14. The second plate 14 is opposed to the first plate 12 spaced therefrom. The viscoelastic body M is disposed in the space between the first and second plates 12 and 14 and is bonded to them. As the viscoelastic body M, for instance, asphalt containing therein organic polymer may be used. FIG. 4 shows the mechanical characteristics of the viscoelastic body M. In FIG. 4, the abscissa represents the amplitude V or velocity S of vibration acting on the viscoelastic body M which is equal to the shearing deformation of the viscoelastic body M. For a given structure, the amplitude V and the velocity are proportional to each other, and they are equivalent to each other. Accordingly, they are represented by the amplitude V, hereinbelow. The ordinate represents the resisting force f per unit area. As can be understood from FIG. 4, the mechanical characteristics of the viscoelastic body M vary according to the kind of viscoelastic body M. Generally in the case of a hard material M1, though the resistance gradient is large and a large resisting force f can be obtained even against a small amplitude V, the resisting force f is rapidly reduced against a large amplitude V to lose its function. That is, the limit amplitude VC1 is small. On the other hand, in the case of a soft material M2, the resistance gradient is small and the resisting force f against a given amplitude is smaller than the hard material M1. However the soft material M2 can withstand a large amplitude and the limit amplitude VC2 is large.

In accordance with the vibration damping method of the first embodiment, at least two vibration damping mechanisms 10 which are different from each other in the mechanical characteristics are provided between the upper and lower transverse members 2a and 2b. When vibration acts on the structure, the first and second plates 12 and 14 are oscillated relative to each other in the vertical direction and the vibration is damped through resistance to shearing deformation of the viscoelastic body M caused by the oscillation of the plates 12 and 14. This will be described in more detail, hereinbelow.

In FIG. 5, when vibration of an amplitude V0 acts on the structure in the horizontal direction, the first and second plates 12 and 14 are rotated back and forth respectively about the first and second pivot shafts 11 and 13 through an angle θ and oscillated relative to each other i a direction perpendicular to the direction of the vibration (in a direction parallel to the posts 1). When the amount of oscillation is represented by b, the relation among the angle θ, the distance L between the first and second pivot shafts 11 and 13 and the distance h between the first pivot shafts 11 or between the second pivot shafts 13 as measured in the vertical direction can be approximated to tanθ=b/L. Accordingly the amount of oscillation b can be represented as b=L/h·V0 or b=β·V0, wherein β is an amplitude conversion coefficient and equal to L/h. The viscoelastic body M sandwiched between the first and second plates 12 and 14 is oscillated in synchronization with the plates 12 and 14 in the same amount of oscillation b, thereby causing shearing deformation. That is, since the amount of oscillation b in the vibration damping mechanism 10 is equal to the product of the amplitude V0 of the vibration and the conversion coefficient β(=L/h), the amount of oscillation b can be set to any value irrespective of the amplitude V0 of the vibration imparted thereto by suitably setting the conversion coefficient β by changing the distance L between the first and second pivot shafts 11 and 13 and the distance h between the first pivot shafts 11 or between the second pivot shafts 13 as measured in the vertical direction. Accordingly unlike in the aforesaid conventional vibration damping mechanism where the amount of oscillation b is fixed to a value equal to the amplitude V0 of the imparted vibration (i.e., β=1), the amount of oscillation b can be freely set in the vibration damping mechanism 10 of this embodiment. As a result, by using a plurality of vibration damping mechanisms 10 having different kinds of viscoelastic body M, vibrations of various amplitudes V0 can be coped with.

In order to facilitate understanding of this embodiment, the system having a pair of vibration damping mechanisms 10 between a pair of transverse members 2 will be described comparing with the conventional vibration damping system, hereinbelow.

Figure 6A:
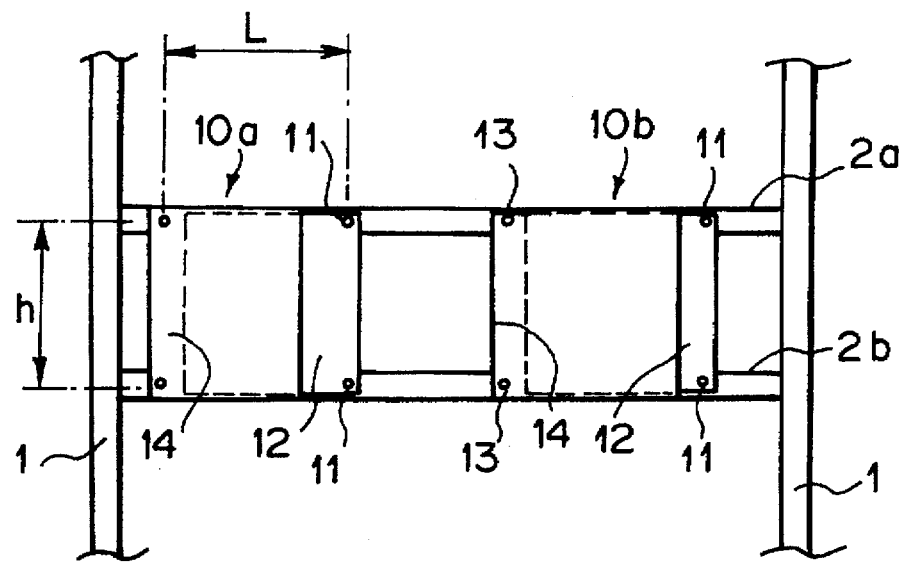
FIG. 6A is a front view of a simplified version of the vibration damping system in accordance with the first embodiment.
Figure 6B:
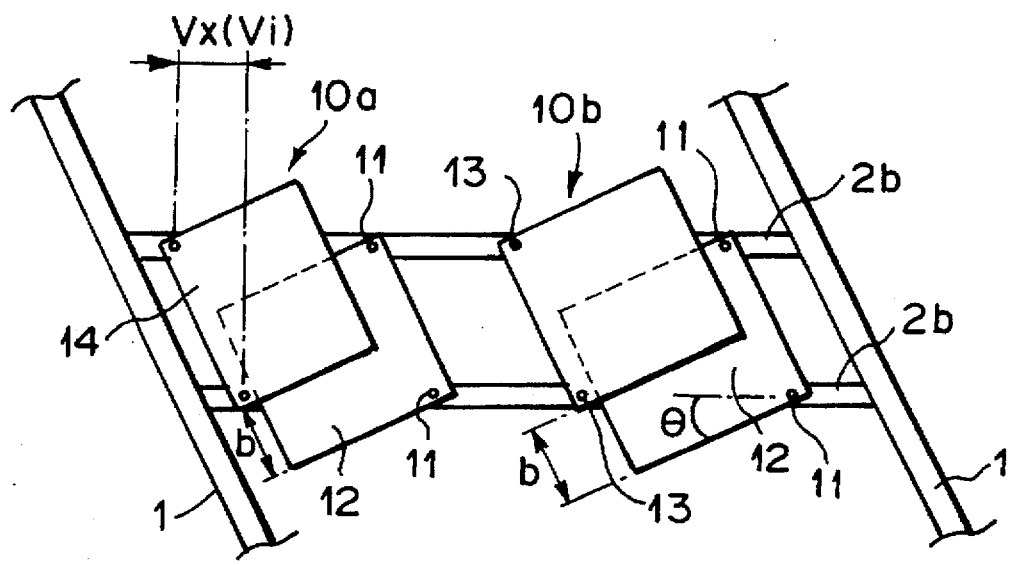
FIG. 6B is a view for illustrating the operation of the vibration damping system shown in FIG. 6A.
Figure 7A:
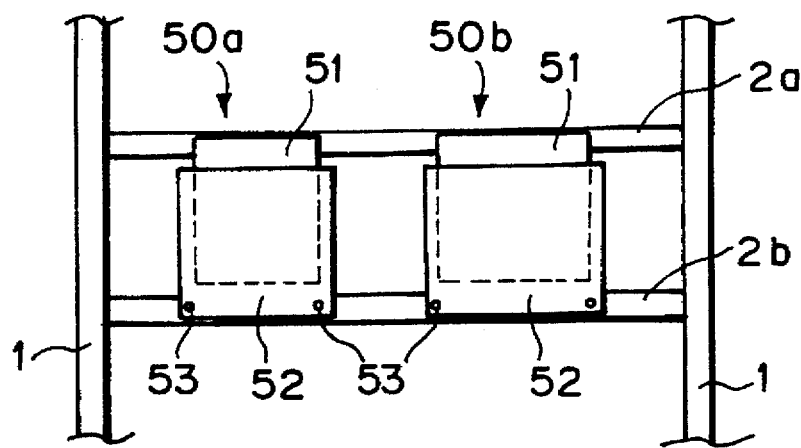
FIG. 7A is a front view of a simplified version of a conventional vibration damping system.
Figure 7B:
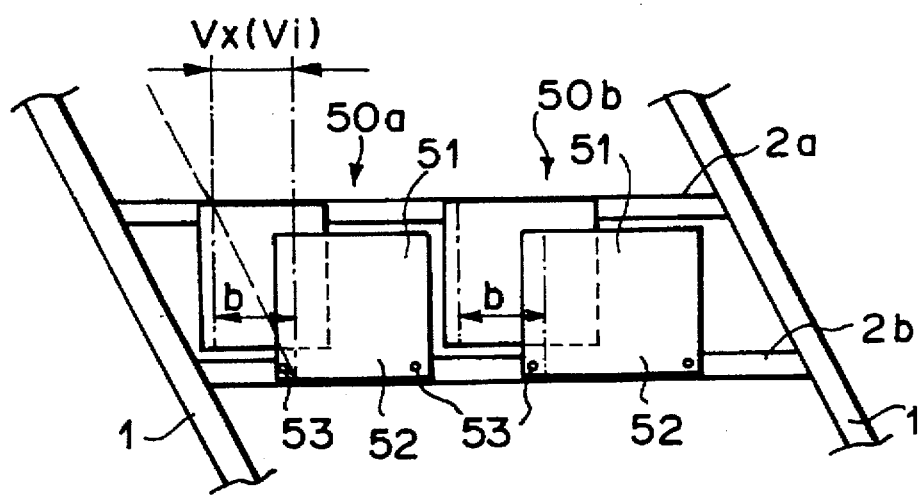
FIG. 7B is a view for illustrating the operation of the vibration damping system shown in FIG. 7A.
Figure 18:
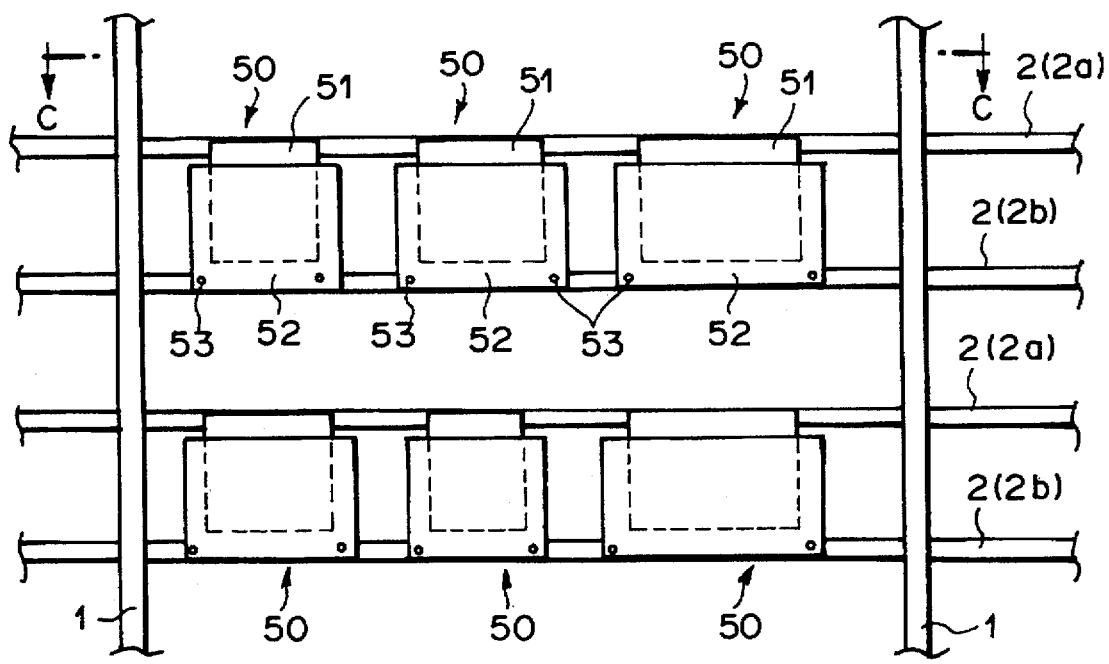
FIG. 18 is a front view of a vibration damping system in accordance with a prior art.
Figure 19:
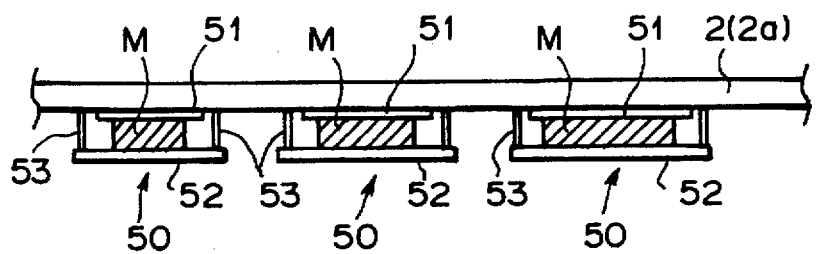
FIG. 19 is a view taken in the direction of arrows C—C in FIG. 18.
Figure 20:
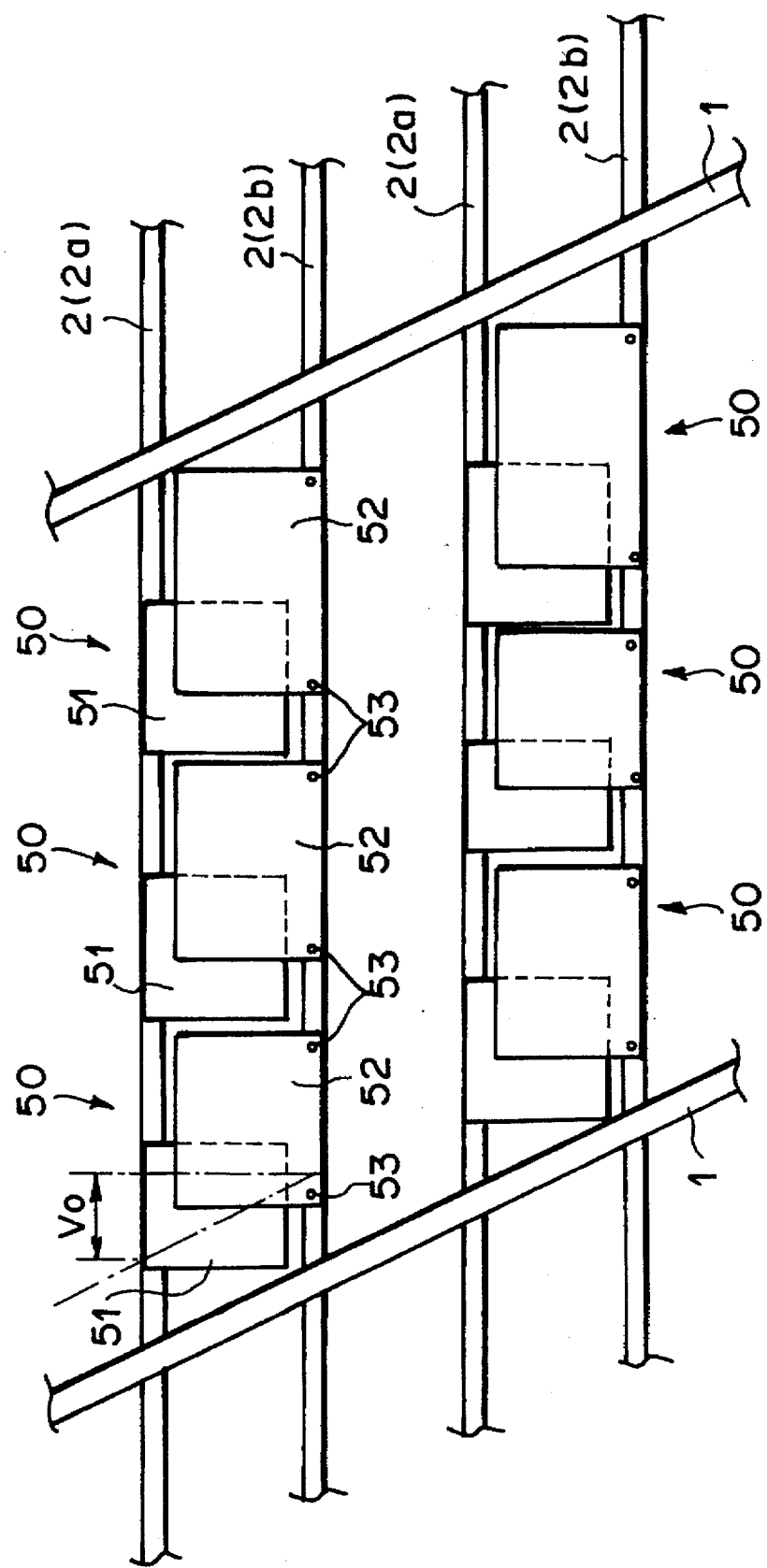
FIG. 20 is a view for illustrating the operation of the vibration damping system shown in FIG. 18.

In FIG. 6A, a simplified version of the vibration damping system of the first embodiment has first and second vibration damping mechanisms 10a and 10b. In the first vibration damping mechanism 10a, L and h are set so that the conversion coefficient β1 is smaller than 1 and a viscoelastic body M1 is employed. In the second vibration damping mechanism 10b, L and h are set so that the conversion coefficient β2 is larger than 1 and a viscoelastic body M2 is employed. The other elements are given the same reference numerals as in FIGS. 2 and 5. In FIG. 7, a simplified version of the aforesaid conventional vibration damping system has first and second vibration damping mechanisms 50a and 50b. A viscoelastic body M1 is employed in the first vibration damping mechanism 50a and a viscoelastic body M2 is employed in the second vibration damping mechanism 50b. In both the vibration damping mechanisms 50a and 50b, the conversion coefficient β is equal to 1. The other elements are given the same reference numerals as in FIGS. 18 and 20. For the simplicity of comparison, it is assumed that the areas of the viscoelastic body M1 and M2 employed in the vibration damping mechanisms 10a, 10b, 50a and 50b are equal to each other, and the maximum amplitude of the vibration imparted to the structure is Vx and the minimum amplitude of the vibration imparted to the structure is Vi (Vx>Vi). When vibration of the maximum amplitude Vx is imparted to the structure, the resisting force of the viscoelastic body M1 becomes f1 in FIG. 4 since the amount of oscillation b of the first and second plates 12 and 14 of the first vibration damping mechanism 10a is equal to β1·Vx and the resisting force of the viscoelastic body M2 becomes f2 in FIG. 4 since the amount of oscillation b of the first and second plates 12 and 14 of the second vibration damping mechanism 10b is equal to β2·Vx. The total resisting force becomes f1+f2. To the contrast, in the case of the first vibration damping mechanism 50a of the conventional system, the amount of oscillation b is equal to Vx, which exceeds the limit amplitude Vc1 of the viscoelastic body M1, since the β=1. Accordingly, the resisting force of the viscoelastic body M1 becomes 0. Further since the amount of oscillation b of the first and second plates 12 and 14 of the second vibration damping mechanism 50b is equal to Vx, the resisting force of the viscoelastic body M2 becomes f4. Accordingly the total resisting force of the viscoelastic bodies M1 and M2 in the conventional system is f4. The total resisting force of the system of the present invention is larger than that of the conventional system (f1+f2>f4). When vibration of the minimum amplitude Vi is imparted to the structure, the resisting force of the viscoelastic body M1 becomes f5 since the amount of oscillation b of the first and second plates 12 and 14 of the first vibration damping mechanism 10a is equal to $\beta 1 \cdot Vi$ and the resisting force of the viscoelastic body M2 becomes f6 since the amount of oscillation b of the first and second plates 12 and 14 of the second vibration damping mechanism 10b is equal to $\beta 2 \cdot Vi$. The total resisting force becomes f5+f6. To the contrast, in the case of the first vibration damping mechanism 50a of the conventional system, the amount of oscillation b is equal to Vi and accordingly, the resisting force of the viscoelastic body M1 becomes f7. Further since the amount of oscillation b of the first and second plates 12 and 14 of the second vibration damping mechanism 50b is equal to Vi, the resisting force of the viscoelastic body M2 becomes f8. Accordingly the total resisting force of the viscoelastic bodies M1 and M2 in the conventional system is f7+f8. The total resisting force of the system of the present invention is larger than that of the conventional system (f5+f6>f7+f8).

When it is assumed that the viscoelastic body M1 is employed in both the vibration damping mechanisms 50a and 50b in the conventional system, the total resisting force of the viscoelastic bodies M1 of the vibration damping mechanisms 50a and 50b against the maximum amplitude Vx is 0 since the maximum amplitude Vx exceeds the limit amplitude Vc1 of the viscoelastic body M1. Accordingly, the resisting force in the system of the first embodiment is apparently larger, i.e., f1+f2>0. Since the resisting force of the viscoelastic body M1 against the minimum amplitude Vi is f7, the total resisting force of the viscoelastic bodies M1 of the vibration damping mechanisms 50a and 50b of the conventional system is 2·f7. Accordingly, the resisting force in the system of the first embodiment is apparently larger, i.e., f5+f6>2·f7. Similarly when it is assumed that the viscoelastic body M2 is employed in both the vibration damping mechanisms 50a and 50b in the conventional system, the total resisting force of the viscoelastic bodies M2 of the vibration damping mechanisms 50a and 50b against the maximum amplitude Vx is 2·f4. Accordingly, the resisting force in the system of the first embodiment is apparently larger, i.e., f1+f2>2·f4. Since the resisting force of the viscoelastic body M2 against the minimum amplitude Vi is f8, the total resisting force of the viscoelastic bodies M2 of the vibration damping mechanisms 50a and 50b of the conventional system is 2·f8. Accordingly, the resisting force in the system of the first embodiment is apparently larger, i.e., f5+f6>2·f8.

As can be understood from the description above, by setting the conversion coefficients $\beta$ of the vibration damping mechanisms 10a and 10b to values not equal to 1 ($\beta 1>1$, $\beta 2<1$) as in the first embodiment, the total resisting force of the system can be made larger against both the maximum amplitude Vx and the minimum amplitude Vi as compared with the conventional system where the conversion coefficients $\beta$ of the vibration damping mechanisms 50a and 50b are 1. Accordingly when a plurality of vibration damping mechanisms 10 are mounted on the structure and the conversion coefficients $\beta$ of the respective viscoelastic bodies M of the vibration damping mechanisms 10 are properly set to conform to the mechanical characteristics of the respective viscoelastic bodies M, the system can exhibit large resisting force against various amplitudes V0, thereby effectively damping horizontal vibration of the structure.

Figure 9A:
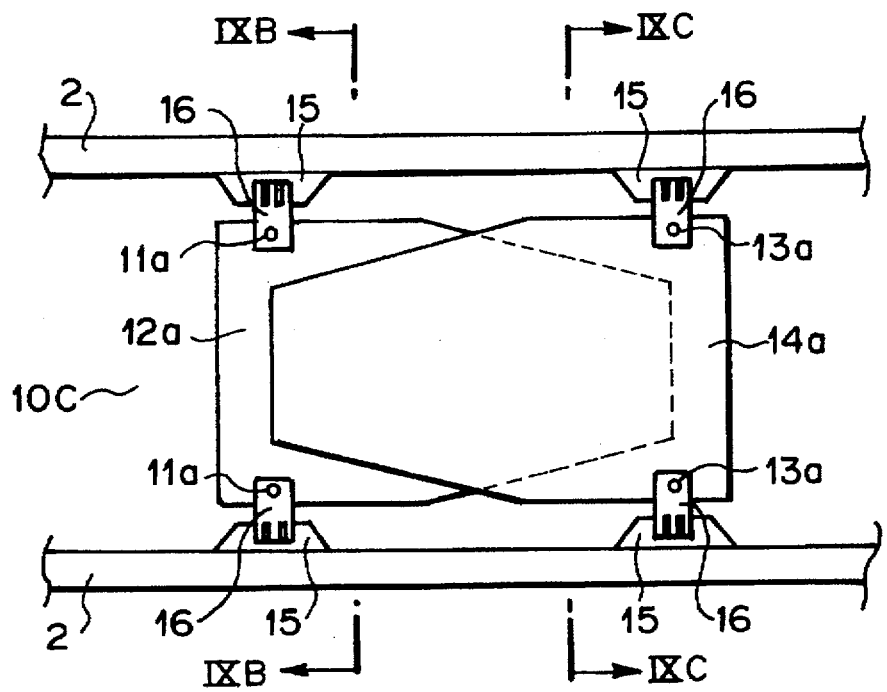
FIG. 9A is a front view of another modification of the vibration damping mechanism.
Figure 9B:
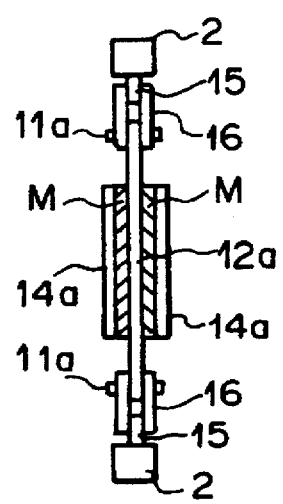
FIG. 9B is a cross-sectional view taken along line IXB—IXB in FIG. 9A.
Figure 9C:
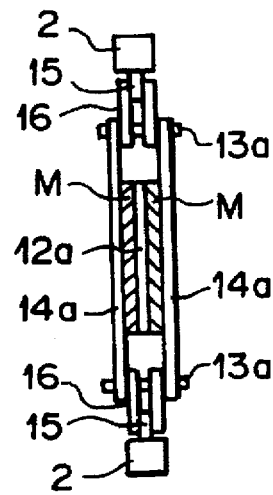
FIG. 9C is a cross-sectional view taken along line IXC—IXC in FIG. 9A.

Though, in the embodiment described above, a plurality of vibration damping mechanisms 10 having different kinds of viscoelastic body M are employed, different kinds of viscoelastic bodies M1 and M2 may be separately provided in one vibration damping mechanism 10A as shown in FIG. 8. Also in this case, the amount of oscillation b can be freely set irrespective of the amplitude V0 of vibration, and the same operation and result can be obtained. Further as shown in FIG. 8, the first and second plates 12 and 14 of a plurality of vibration damping mechanisms may be alternately arranged in staggered fashion and the first and second pivot shafts 11 and 13 may be used in common by adjacent vibration damping mechanisms 10. Further a plurality of (three in the illustrated example) vibration damping mechanisms 10B may be formed by arranging a plurality of plates 12a and 11a in parallel spaced from each other and providing different kinds of viscoelastic bodies M1, M2 and M3 in the respective spaces as shown in FIG. 8. Further the pivot shafts need not be directly mounted on the transverse members so long as the plates are rotatable relative to the pivot shafts. Accordingly the plates may be variously mounted. For example, as shown in FIGS. 9A to 9C, the plates 12a and 14a may be mounted by fixedly mounting joints 16 on brackets 15 which are fixed to the transverse members 2, applying the plates 12a and 14a to the joints and inserting pivot shafts 11a and 13a into holes (not shown) in the plates 12a and 14a. Also in the modification shown in FIGS. 9A to 9C, three plates are arranged spaced from each other and a pair of viscoelastic bodies M are disposed in the spaces between the plates, thereby forming a pair of vibration damping mechanisms 10C. Further the vibration damping mechanisms need not be always mounted in the vertical direction like between a pair of opposed transverse members, but may be mounted in the horizontal direction depending on the direction of vibration. For example, the vibration damping mechanisms may be mounted between a pair of opposed vertical posts or between a pair of opposed beams.

A vibration damping system in accordance with a second embodiment of the present invention will be described with reference to FIGS. 10 to 13, hereinbelow.

In the second embodiment, a vibration energy consuming means such as an oil damper is employed in place of vibration damping mechanism utilizing a viscoelastic body employed in the first embodiment.

Figure 10:
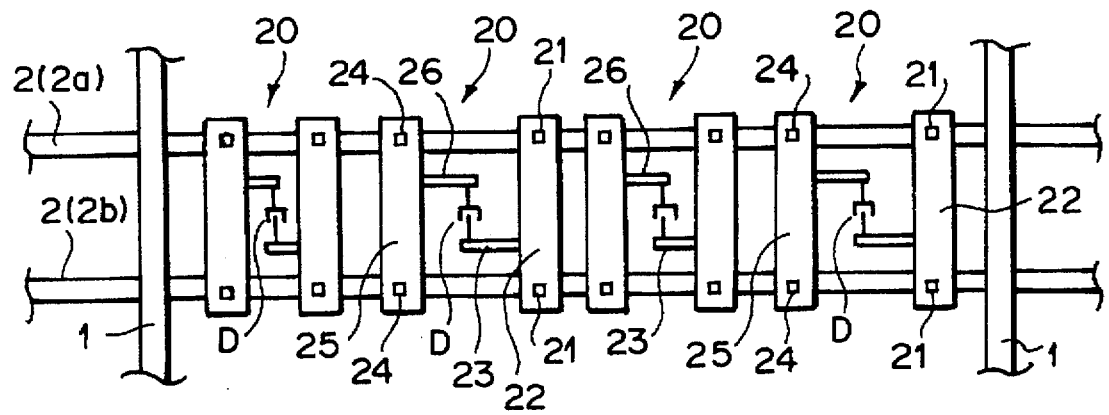
FIG. 10 is a front view of a vibration damping system for carrying out a vibration damping method in accordance with a second embodiment of the present invention.
Figure 11:
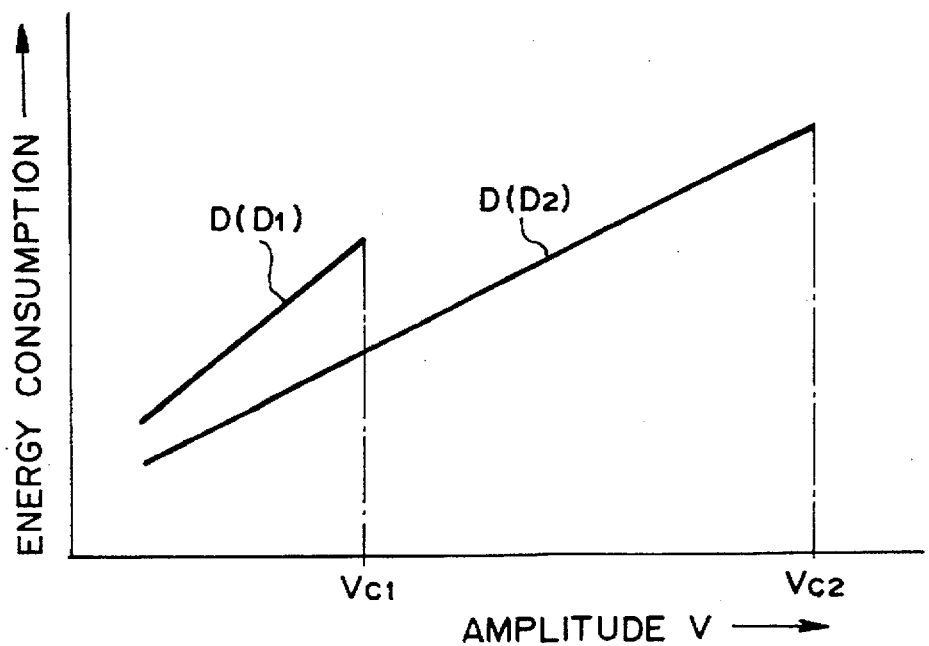
FIG. 11 is a view showing properties of the oil damper.

In FIG. 10, the vibration damping system of the second embodiment comprises a plurality of vertical posts (frame members) 1 stood at predetermined intervals and a plurality of transverse members (frame members) 2 which extend across the posts 1 and are arranged in the vertical direction. A plurality of vibration damping mechanisms 20 are installed between a pair of opposed transverse members 2, i.e., upper transverse member 2a and lower transverse member 2b. Each vibration damping mechanism 20 comprises a pair of first pivot shafts 21, a pair of second pivot shafts 24, a first pillar 22, a second pillar 25 and an oil damper D. One of the first pivot shafts 21 is mounted on the upper transverse member 2a and the other is mounted on the lower transverse member 2b. The first pivot shafts 21 are positioned in alignment with each other in a vertical direction. One of the second pivot shafts 24 is mounted on the upper transverse member 2a at a predetermined distance from the first pivot shaft 21 on the upper transverse member 2a and the other is mounted on the lower transverse member 2b at the same distance from the first pivot shaft 21 on the lower transverse member 2b. The second pivot shafts 24 are positioned in alignment with each other in a vertical direction. The first pillar 22 extends between the upper and lower transverse members 2a and 2b and is supported for rotation by the first pivot shafts 21 which are loosely fitted in holes (not shown) respectively formed in upper and lower end portions of the first pillar 22. The second pillar 25 extends between the upper and lower transverse members 2a and 2b and is supported for rotation by the second pivot shafts 24 which are loosely fitted in holes (not shown) respectively formed in upper and lower end portions of the second pillar 25. A first arm 23 extends horizontally toward the second pillar 25 from a lower portion of the first pillar 22 and a second arm 26 extends horizontally toward the first pillar 22 from an upper portion of the second pillar 25. The oil damper D extends in the vertical direction in parallel to the posts 1 and connects the first and second arms 23 and 26. FIG. 11 shows the mechanical characteristics of the oil damper D. In FIG. 11, the abscissa represents the amplitude V of vibration acting on the oil damper D and the ordinate represents energy consumption. As can be understood from FIG. 11, the mechanical characteristics of the oil damper D vary according to the kind of the oil damper D. Generally in the case of an oil damper D1 in which the consumption gradient is large and a large energy consumption can be obtained even against a small amplitude V, the energy consumption e is rapidly reduced against a large amplitude V to lose its function. That is, the limit amplitude VC1 is small. On the other hand, in the case of an oil damper D2 in which the consumption gradient is small and the energy consumption against a given amplitude is smaller can withstand a large amplitude and the limit amplitude VC2 is large.

In accordance with the vibration damping method of the second embodiment, at least two vibration damping mechanisms 20 which are different from each other in the mechanical characteristics of their oil dampers D are provided between the upper and lower transverse members 2a and 2b. When vibration acts on the structure, the oil dampers D are oscillated in the vertical direction and the vibration is damped through energy consumption of the oil dampers D. This will be described in more detail, hereinbelow.

Figure 12:
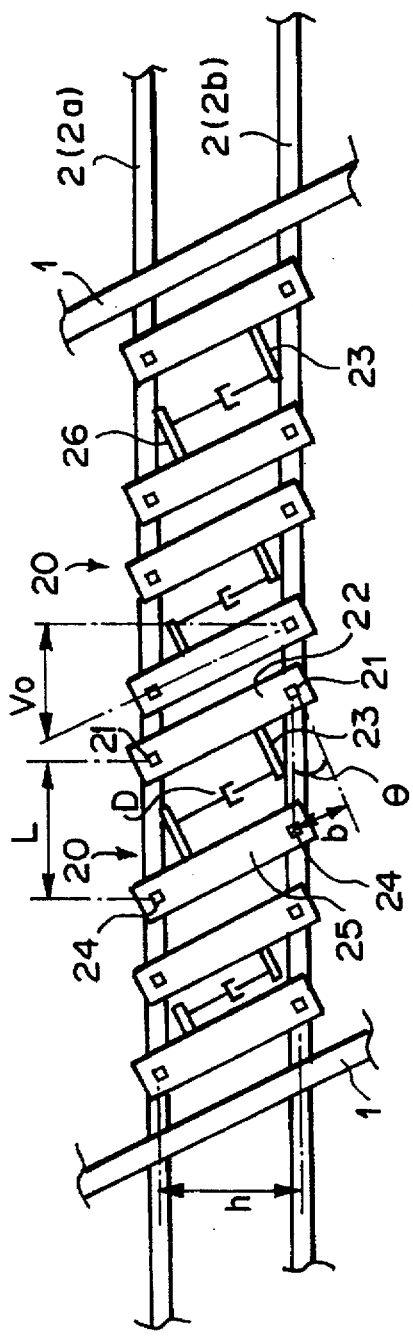
FIG. 12 is a view for illustrating the operation of the vibration damping system shown in FIG. 10.

In FIG. 12, when vibration of an amplitude V0 acts on the structure in the horizontal direction, the first and second pillars 22 and 25 are rotated back and forth respectively about the first and second pivot shafts 21 and 24, whereby the first and second arms 23 and 26 are displaced back and forth through an angle θ and the oil damper D between the first and second arms 23 and 26 is oscillated in the vertical direction (in a direction parallel to the posts 1). When the amount of oscillation is represented by b, the relation among the angle θ, the distance L between the first and second pivot shafts 11 and 13 and the distance h between the first pivot shafts 11 or between the second pivot shafts 13 as measured in the vertical direction can be approximated to tanθ=b/L. Accordingly the amount of oscillation b can be represented as b=L/h·V0 or b=β·V0, wherein β is an amplitude conversion coefficient and equal to L/h. That is, as in the vibration damping mechanism 10 employed in the first embodiment, the amount of oscillation b of the oil damper D can be set to any value irrespective of the amplitude V0 of the vibration imparted thereto by suitably setting the conversion coefficient β by changing the distance L between the first and second pivot shafts 11 and 13 and the distance h between the first pivot shafts 11 or between the second pivot shafts 13 as measured in the vertical direction. Accordingly by using a plurality of vibration damping mechanisms 20 having different kinds of oil damper D, vibrations of various amplitudes V0 can be coped with. Thus the vibration damping system of the second embodiment can function in the same manner as the system of the first embodiment where a plurality of the vibration damping mechanisms using different viscoelastic bodies M are employed. Accordingly when a plurality of vibration damping mechanisms 20 are mounted on the structure and the conversion coefficients β are properly set to conform to the mechanical characteristics of the respective oil dampers D, the system can exhibit large energy consumption e against various amplitudes V0, thereby effectively damping horizontal vibration of the structure.

Figure 13:
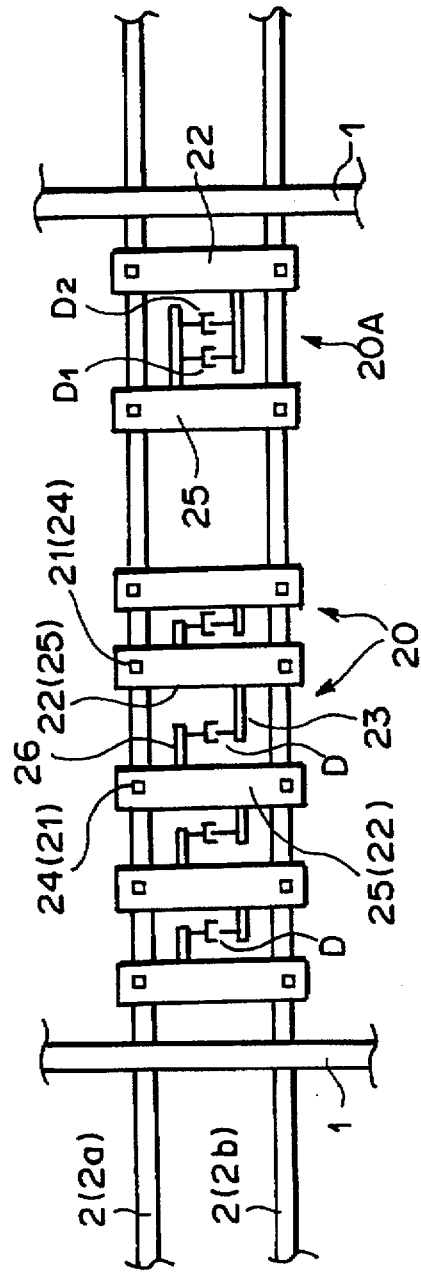
FIG. 13 is a front view showing modifications of the vibration damping mechanism.

Though, in the embodiment described above, a plurality of vibration damping mechanisms 20 having different kinds of oil damper D are employed, different kinds of oil dampers D1 and D2 may be provided in one vibration damping mechanism 20A as shown in FIG. 13. Also in this case, the amount of oscillation b can be freely set irrespective of the amplitude V0 of vibration, and the same operation and result can be obtained. Further as shown in FIG. 13, a plurality of oil dampers D may be connected between one first pillar 22 and one second pillar 25 so that the first and second pillars 22 and 25 are used in common by the oil dampers D. Further the oil damper D need not be always oriented in the vertical direction but may be in any direction other than the direction of vibration. Further the pivot shafts 21 and 24 need not be always directly mounted on the transverse members 2 so long as the pillars 22 and 25 are rotatable relative to the pivot shafts and may be mounted in the manner described above in conjunction with FIG. 9. Further the vibration damping mechanisms need not be always mounted in the vertical direction like between a pair of opposed transverse members, but may be mounted in the horizontal direction depending on the direction of vibration. For example, the vibration damping mechanisms may be mounted between a pair of opposed vertical posts or between a pair of opposed beams.

A vibration damping system in accordance with a third embodiment of the present invention will be described with reference to FIGS. 14 to 17, hereinbelow.

In the third embodiment, a vibration energy consuming means such as an oil damper is employed as in the second embodiment.

Figure 14:
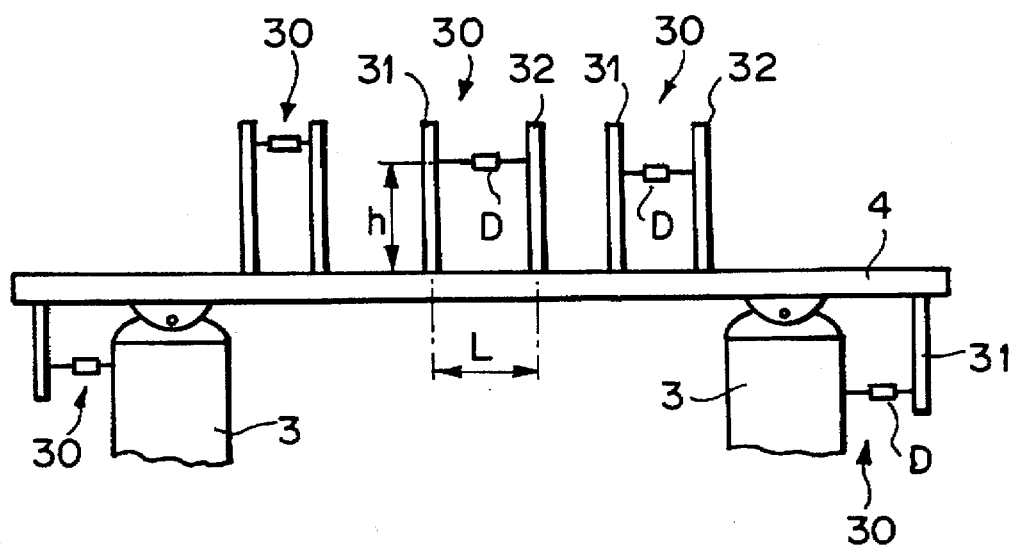
FIG. 14 is a front view of a vibration damping system for carrying out a vibration damping method in accordance with a third embodiment of the present invention.
Figure 15:
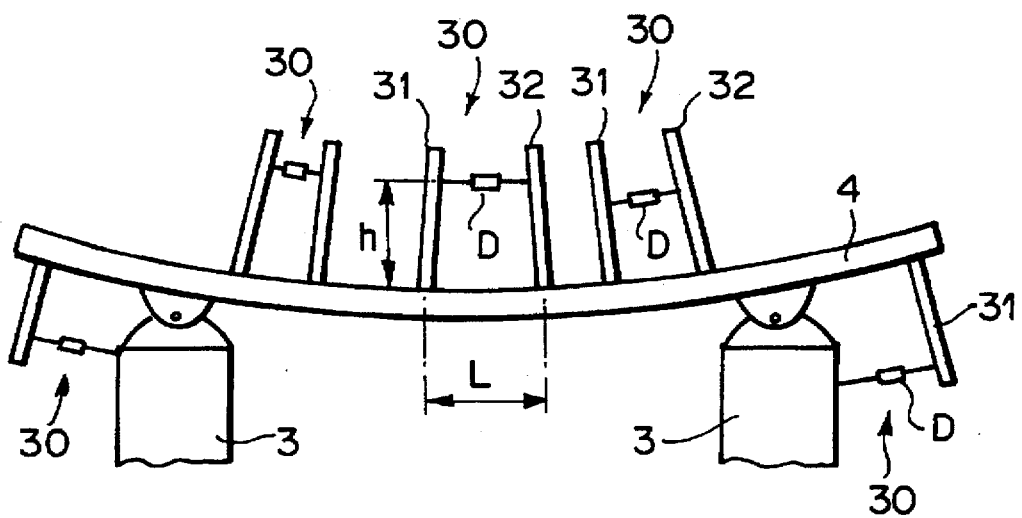
FIG. 15 is a view for illustrating the operation of the vibration damping system shown in FIG. 14.

In FIG. 14, the vibration damping system of the third embodiment comprises a plurality of vibration damping mechanisms 30 provided on a beam member 4 which is supported on a pair of hinge supports 3. Each vibration damping mechanism 30 comprises first and second pillars 31 and 32 stood on the beam member 4 and an oil damper D connected between the first and second pillars 31 and 31. That is, the first and second pillars 31 and 32 are disposed on the beam member 4 spaced from each other by a distance L with their one ends fixed to the beam member 4. The oil damper D is horizontally (in a direction parallel to the beam member 4) connected between the first and second pillars at a height h. The vibration damping mechanism 30 may be formed by connecting a first pillar 31 and the hinge support 3 with an oil damper D. The mechanical characteristics of the oil damper D may be the same as those employed in the second embodiment.

Figure 16:
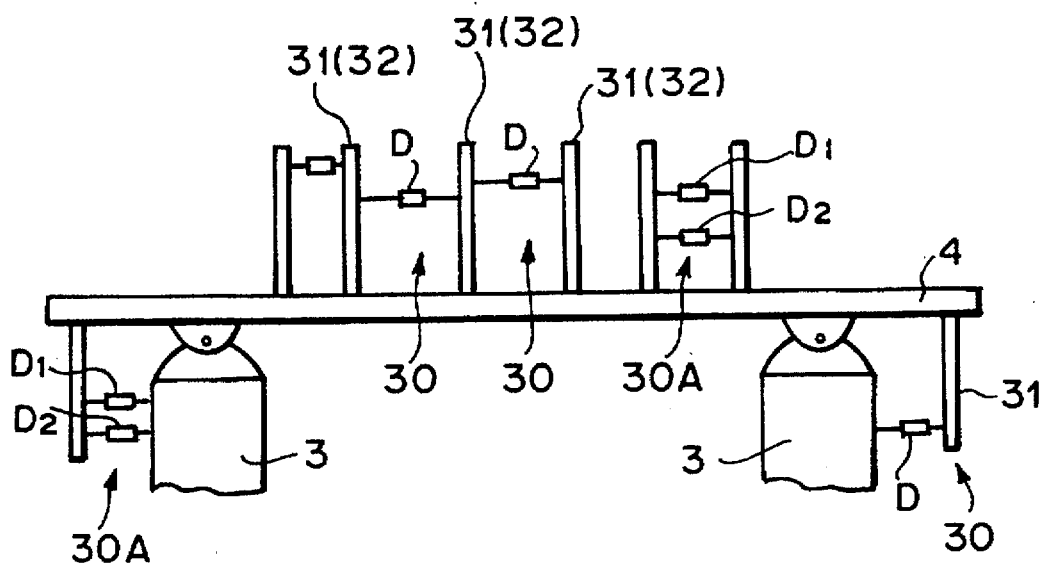
FIG. 16 is a front view showing modifications of the vibration damping mechanism.

In accordance with the vibration damping method of the third embodiment, at least two vibration damping mechanisms 30 which are different from each other in the mechanical characteristics of their oil dampers D are provided on the beam member 4 and vertical vibration is damped through energy consumption of the oil dampers D. This will be described in more detail with reference to FIG. 15, hereinbelow. When vibration of amplitude V0 is imparted to the beam structure in the vertical direction, the beam member 4 is deflected up and down and the first and second pillars 31 and 32 are moved toward and away from each other, whereby the oil damper D between the pillars 31 and 32 is oscillated in the horizontal direction (in parallel to the beam member 4). Though the amount of oscillation b in this case cannot be calculated so easily as that in the second embodiment, it can be represented as a function of the distance L between the first pillar 31 and the second pillar 32 (or the hinge support 3), the distance h of the oil damper D from the beam member 4 and the amplitude V0 of the vibration and increases with increase in L or h. That is, as in the vibration damping mechanism 20 in the second embodiment, the amount of oscillation b of the oil damper D in this embodiment can be freely set irrespective of the amplitude V0 by properly changing L and/or h. Accordingly by providing a plurality of vibration damping mechanisms 30 having different kinds of oil damper D on the beam member 4, vibrations of various amplitudes V0 can be coped with. By setting the amount of oscillation b of each oil damper D by selecting L and/or h to conform to the mechanical characteristics of the oil damper D, e.g., by setting small the amount of oscillation b for a vibration damping mechanism 30 using an oil damper D whose energy consumption gradient is large by setting L and/or h to a small value while setting large the amount of oscillation b for a vibration damping mechanism 30 using an oil damper D whose energy consumption gradient is small by setting L and/or h to a large value, energy consumption of the oil damper D can be increased against various amplitudes V0, thereby effectively damping vertical vibration of the structure. Though, in the embodiment described above, a plurality of vibration damping mechanisms 30 having different kinds of oil damper D are employed, different kinds of oil dampers D1 and D2 may be provided in one vibration damping mechanism 30A as shown in FIG. 16. Also in this case, the amount of oscillation b can be freely set irrespective of the amplitude V0 of vibration, and the same operation and result can be obtained. Further as shown in FIG. 16, a plurality of oil dampers D may be connected between one first pillar 31 and one second pillar 32 so that the first and second pillars 31 and 32 are used in common by the oil dampers D. Further the oil damper D need not be always oriented in the horizontal direction but may be in any direction other than the direction of vibration.

Figure 17:
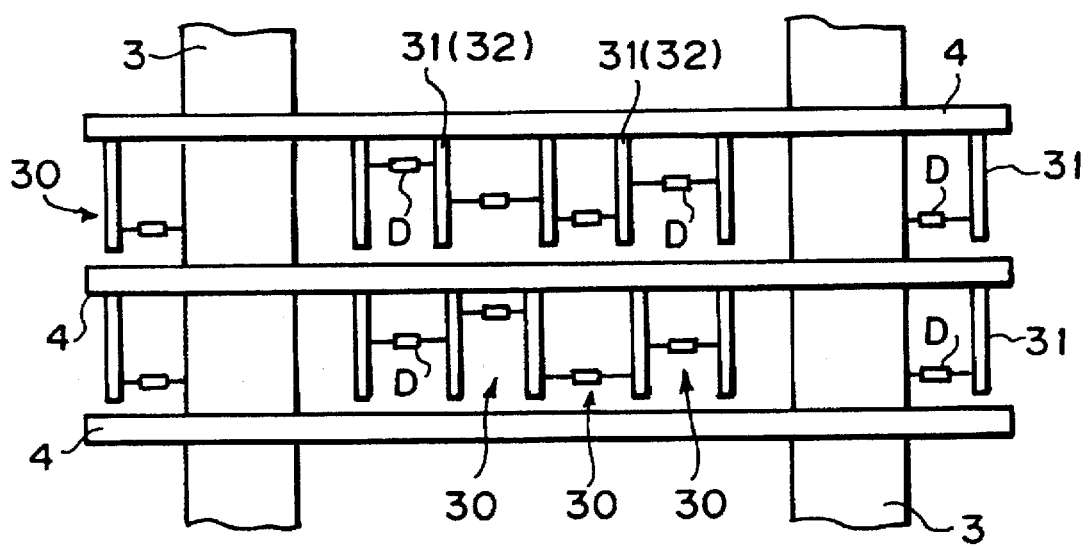
FIG. 17 is a front view of a vibration damping system for carrying out a vibration damping method in accordance with a fourth embodiment of the present invention.

In the vibration damping system in accordance with a fourth embodiment of the present invention shown in FIG. 17, a plurality of vibration damping mechanisms 30 which are the same in structure as those employed in the third embodiment are employed to damp vibration of beam members 4 supported on hinge supports 3 in a horizontal direction perpendicular to the members 4. In FIG. 17, the elements analogous to those shown in FIG. 14 are given the same reference numerals. In this embodiment, the oil dampers D are oscillated in response to repeated deflection in the horizontal direction of the beam members 4 and vibration of the beam members 4 is damped by energy consumption by the oil dampers D.

The vibration damping systems of the first to fourth embodiments are installed, for instance, on a roof or ceiling of a building or on a handrail of a bridge.

What is claimed is:

1. A vibration damping system for damping vibration of a structure, comprising one or more vibration damping mechanisms each comprising a first plate rotatably mounted on a pair of first pivot shafts respectively mounted on a pair of opposed frame members of the structure, a second plate which is rotatably mounted on a pair of second pivot shafts respectively mounted on the opposed frame members at a predetermined distance from the first pivot shafts and is opposed to the first plate intervening a space therebetween, and a viscoelastic body provided in the space between the first and second plates, wherein one of said one or more vibration damping mechanisms includes a plurality of viscoelastic bodies which are different from each other in mechanical properties and is mounted between said pair of opposed frame members or a plurality of said one or more vibration damping mechanisms include viscoelastic bodies different from each other in mechanical properties are mounted between said pair of opposed frame members, wherein a conversion coefficient $\beta$, which is the ratio of the predetermined distance L between the first and second pivot shafts to one of a distance h between the first pivot shafts and a distance h between the second pivot shafts for each vibration damping mechanism, is set according to the mechanical properties of the viscoelastic body of the vibration damping mechanism.

2. A vibration damping system for damping vibration of a structure, comprising one or more vibration damping mechanisms each comprising a first pillar rotatably mounted on a pair of first pivot shafts respectively mounted on a pair of opposed frame members of the structure, a second pillar rotatably mounted on a pair of second pivot shafts respectively mounted on the opposed frame members at a predetermined distance from the first pivot shafts, and a vibration energy consuming means which is connected between the first and second pillars and oriented in a direction other than the direction of the vibration, wherein one of said one or more vibration damping mechanisms includes a plurality of vibration energy consuming means which are different from each other in mechanical properties and is mounted between said pair of opposed frame members or a plurality of said one or more vibration damping mechanisms include vibration energy consuming means different from each other in mechanical properties are mounted between said pair of opposed frame members, wherein a conversion coefficient $\beta$, which is the ratio of the predetermined distance L between the first and second pivot shafts to one of a distance h between the first pivot shafts and a distance h between the second pivot shafts for each vibration damping mechanism, is set according to the mechanical properties of the vibration energy consuming means of the vibration damping mechanism.

3. A vibration damping system for damping vibration of a structure, comprising one or more vibration damping mechanisms each comprising first and second pillars which are fixed to a frame member at respective first ends at a predetermined distance from each other and a vibration energy consuming means which is connected between the first and second pillars or between the first pillar and a support, which supports the structure, and oriented in a direction other than the direction of the vibration, wherein one of said one or more vibration damping mechanisms includes a plurality of vibration energy consuming means which are different from each other in mechanical properties and is mounted between said first and second pillars or between the first pillar and the support, or a plurality of said one or more vibration damping mechanisms include vibration energy consuming means different from each other in mechanical properties are mounted between said first and second pillars or between the first pillar and the support, wherein a conversion coefficient β which is the ratio of the predetermined distance L between the first and second pillars or between the first pillar and the support to a distance h between the frame member and the vibration energy consuming means for each vibration damping mechanism, is set according to the mechanical properties of the vibration energy consuming means of the vibration damping mechanism.

4. A method of damping vibration of a structure, comprising the steps of:

providing one or more vibration damping mechanisms each comprising a first plate rotatably mounted on a pair of first pivot shafts respectively mounted on a pair of opposed frame members of the structure and a second plate which is rotatably mounted on a pair of second pivot shafts respectively mounted on the opposed frame members at a predetermined distance from the first pivot shafts and is opposed to the first plate intervening a space therebetween;

providing one of said one or more vibration damping mechanisms with a plurality of viscoelastic bodies which are different from each other in mechanical properties, or a plurality of said one or more vibration damping mechanisms with viscoelastic bodies different from each other in mechanical properties, said viscoelastic bodies being provided in the space between the first and second plates; and setting a conversion coefficient β, which is the ratio of the predetermined distance L between the first and second pivot shafts to one of a distance h between the first pivot shafts and a distance h between the second pivot shafts for each vibration damping mechanism, according to the mechanical properties of the viscoelastic body of the vibration damping mechanism.

5. A method of damping vibration of a structure, comprising the steps of:

providing one or more vibration damping mechanisms each comprising a first pillar rotatably mounted on a pair of first pivot shafts respectively mounted on a pair of opposed frame members of the structure and a second pillar rotatably mounted on a pair of second pivot shafts respectively mounted on the opposed frame members at a predetermined distance from the first pivot shafts;

providing one of said one or more vibration damping mechanisms with a plurality of vibration energy consuming means which are different from each other in mechanical properties, or a plurality of said one or more vibration damping mechanisms with vibration energy consuming means different from each other in mechanical properties, said vibration energy consuming means being connected between said first and said second pillars and oriented in a direction other than a direction of vibration;

setting a conversion coefficient β, which is the ratio of the predetermined distance L between the first and second pivot shafts to one of a distance h between the first pivot shafts and a distance h between the second pivot shafts for each vibration damping mechanism, according to the mechanical properties of the vibration energy consuming means of the vibration damping mechanism.

6. A method of damping vibration of a structure, comprising the steps of:

providing one or more vibration damping mechanisms each comprising first and second pillars fixed to a frame member at respective first ends at a predetermined distance from each other;

providing one of said one or more vibration damping mechanisms with a plurality of vibration energy consuming means which are different from each other in mechanical properties, or a plurality of said one or more vibration damping mechanisms with vibration energy consuming means different from each other in mechanical properties, said vibration energy consuming means being connected between said first and second pillars or between said first pillar and a support supporting the structure, said vibration energy consuming means being oriented in a direction other than a direction of vibration; and setting a conversion coefficient β, which is the ratio of the predetermined distance L between the first and second pillars or between said first pillar and the support to a distance h between the frame member and the vibration energy consuming means for each vibration damping mechanism, according to the mechanical properties of the vibration energy consuming means of the vibration damping mechanism.

* * * * *